Feb. 12, 1935.   E. T. VINCENT   1,990,575
ENGINE
Filed Oct. 9, 1930   2 Sheets-Sheet 1
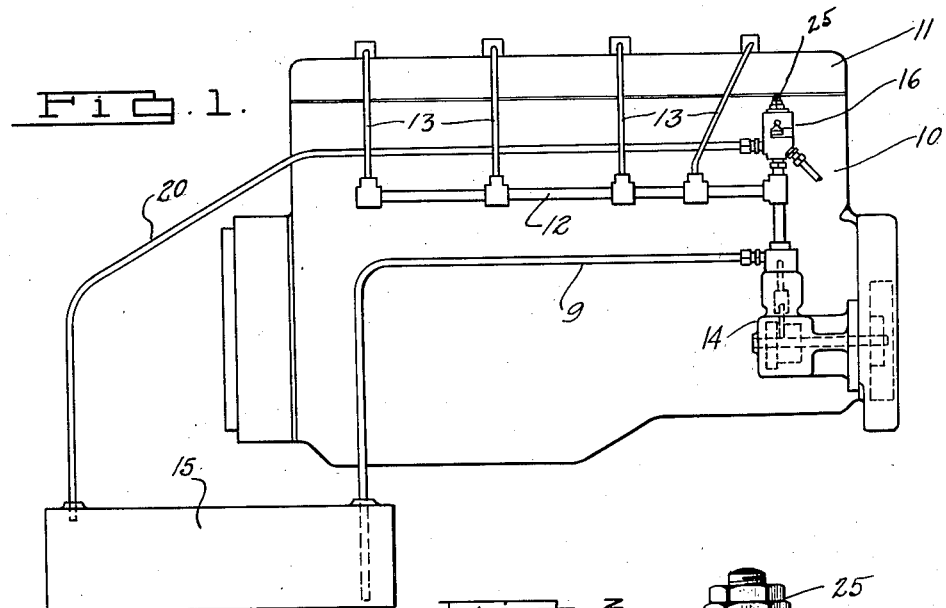
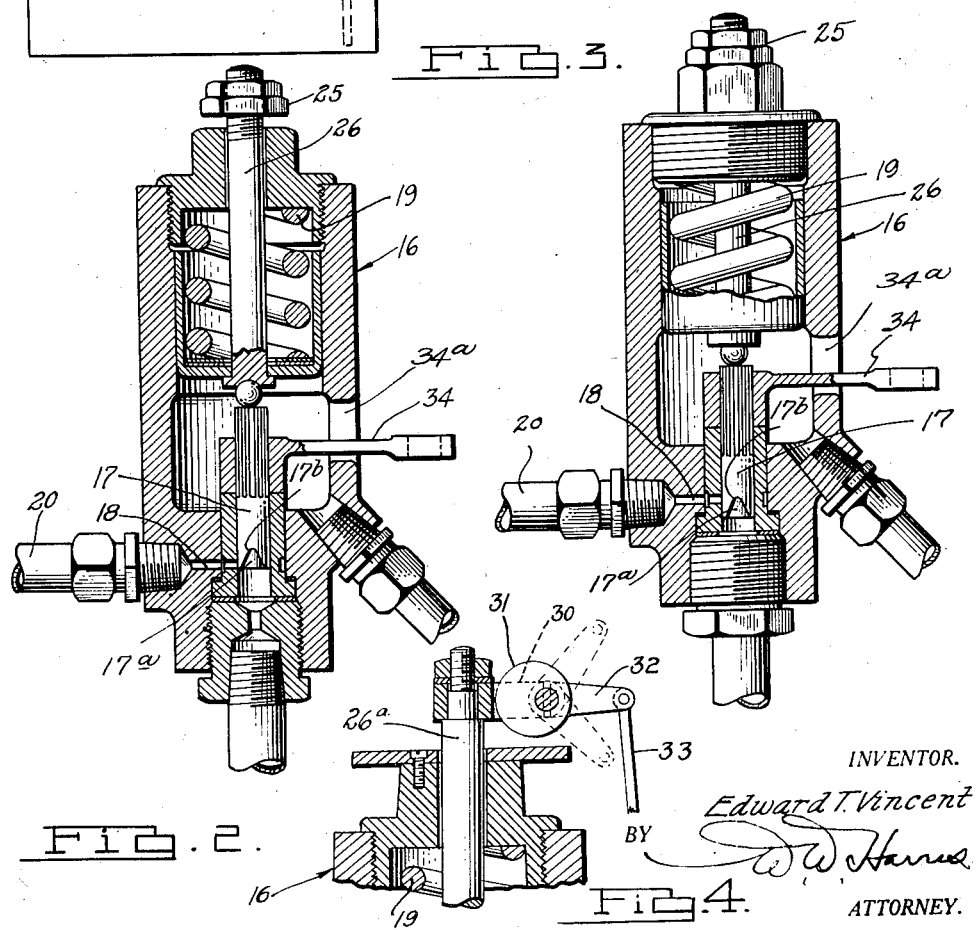
INVENTOR.
Edward T. Vincent
BY
ATTORNEY.

Feb. 12, 1935.  E. T. VINCENT  1,990,575
ENGINE
Filed Oct. 9, 1930   2 Sheets-Sheet 2
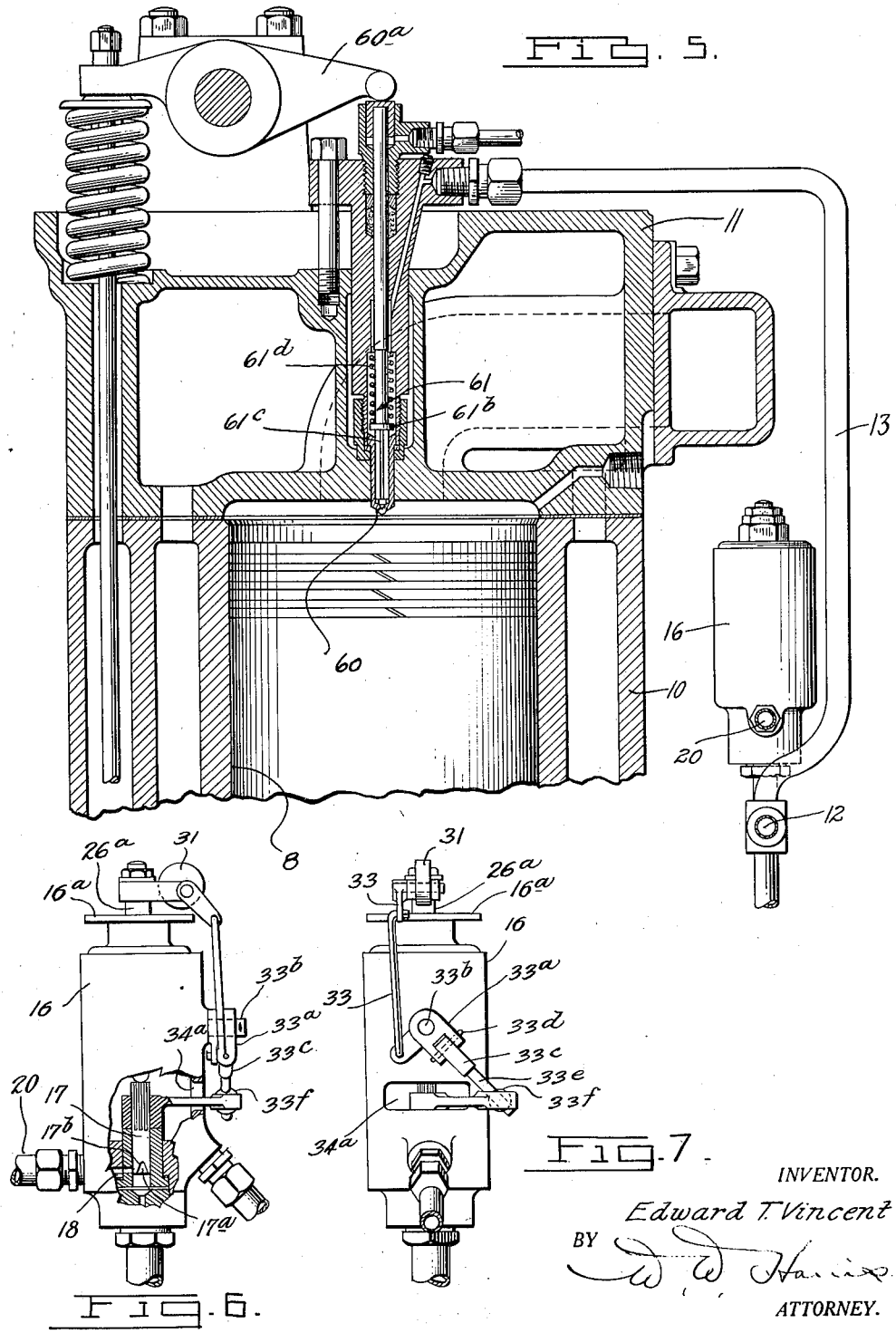
INVENTOR.
Edward T Vincent
BY
ATTORNEY.

Patented Feb. 12, 1935

1,990,575

UNITED STATES PATENT OFFICE 1,990,575

ENGINE

Edward T. Vincent, Detroit, Mich., assignor to Continental Motors Corporation, Detroit, Mich., a corporation of Virginia Application October 9, 1930, Serial No. 487,398

14 Claims. (Cl. 123—32)

My invention relates to an internal combustion engine of the compression ignition type and more particularly relates to a fuel pressure controlling means for regulating the quantity of fuel injected into the engine cylinders for combustion.

One embodiment of my invention has been illustrated in the accompanying drawings showing the same adapted for use with an engine of the aforesaid type provided with a constant pressure fuel injection system. The valve controlling the injection of fuel into the engine cylinder is actuated in response to a predetermined fuel pressures in the fuel supply line of the system, but obviously my device may be embodied in fuel injection systems other than that shown.

It is a well known fact that better fuel economy and more efficient engine performance may be obtained when the engine is operating at full loads since the fuel is injected into the engine cylinder at a relatively higher average pressure. Fuel injected at a relatively high pressure is more finely and uniformly broken up and is better distributed within the combustion space. It has been customary to operate engines of this character at low loads by providing a relatively low fuel pressure in the fuel supply line at the beginning of injection. As a result it is found that engines of this character cannot be operated economically at low speeds because of the relatively low combustion efficiency.

It is an object of my present invention to increase the overall efficiency of an internal combustion engine of the compression ignition type by increasing the engine efficiency more particularly at relatively low engine speeds, and to provide a simplified controlling apparatus that can be readily actuated with a minimum of effort to effect an accurate control of the fuel pressure in the fuel injection system.

Another object of my invention is to better the fuel economy and general efficiency of an engine of the compression ignition type by increasing the mean initial pressures in the fuel supply line under various engine loadings.

A further object of my invention is to increase the efficiency of an internal combustion engine of the aforesaid type by providing means cooperatively associated with the fuel supply line for injecting fuel into the engine cylinders at a relatively high pressure at the beginning of injection when the engine is operating under minimum loads.

For a more detailed understanding of my invention, reference may be had to the accompanying drawings which illustrate one form which my invention may assume, and in which:

Fig. 1 is a side elevational view of an internal combustion engine of the compression ignition type equipped with a fuel pressure controlling device constructed in accordance with my invention, Fig. 2 is a sectional view of my fuel pressure control device showing the relative position of the parts at the beginning of the fuel injection period, Fig. 3 is a similar sectional view showing the relative position of the parts at or near the end of the fuel injection period, Fig. 4 is a slightly modified construction illustrating the mechanism for regulating the device in conjunction with the engine throttle control, Fig. 5 is a sectional view illustrating the fuel injection and atomizing means, Fig. 6 is a view of the fuel pressure regulator partly in section to illustrate the pressure control valve connected with the adjustable device for controlling valve travel, and Fig. 7 is a similar view at right angles with Fig. 6.

The engine chosen for illustrating an embodiment of my invention is of the compression ignition type provided with a constant pressure fuel injection system. The engine comprises a cylinder block or casting 10, having cylinders 8, and a cylinder head 11, the fuel being conducted to the engine cylinders from the fuel supply line or "rail" 12 by means of the conduits 13. A fuel pump 14 or other means for building up pressure is connected with the supply line 12 and also to a source of fuel supply such as a fuel tank 15 by a conduit 9. The fuel pump delivers fuel in excess of the quantities required for injection at any time and thereby builds up pressure in the fuel supply line, this pressure being controlled by a pressure regulator 16 which is so constructed as to regularly control the fuel pressure at the beginning of injection in the fuel supply line. The detailed construction of a modified form of this pressure regulator is described and claimed in my co-pending application, Serial No. 487,642, filed Oct. 10, 1930. Broadly, the pressure regulator comprises a valve 17 which normally closes the outlet port 18 in the casing of the pressure regulator. A compression spring 19 resists the opening of the valve, the valve being regulable so as to uncover the outlet port at various predetermined pressures of the fuel. For this purpose the valve 17 has a groove 17ᵃ at its lower edge, said groove having an inclined side 17ᵇ. By giving the valve 17 a rotative adjustment by lever 34 the side 17$^b$ of groove 17$^a$ may be registered with port 18. Since the fuel pump delivers an excess of fuel it is apparent that the pressure at the beginning of injection in rail 12 will depend on the position of valve 17 since the spring 19 offers more resistance as valve 17 is raised. Valve 17 will raise until port 18 is uncovered and this is determined by side 17$^b$ of groove 17$^a$. In Fig. 2 the valve is shown at maximum elevation for maximum spring compression and maximum fuel pressure. Thus the mechanism as described above controls the fuel pressure, at the beginning of the injection in the fuel supply line, the excessive pressure being relieved through the outlet port 18 which is connected with the fuel tank by a pipe or conduit 20.

The fuel under pressure is conducted to the atomizing means 60 through the said conduit 13, a valve 61 responsive to predetermined fuel pressures in the fuel supply line controlling the injection of the fuel into the engine cylinders 8. The particular type and construction of the fuel injection valve is not important in this application. In Fig. 5 I have illustrated a valve mechanism shown and described in detail in my copending application Ser. No. 479,836 filed September 5, 1930. The valve illustrated is unseated by fuel pressure on timed actuation of the rocker mechanism 60$^a$ and when a predetermined pressure drop in the fuel at the nozzle is reached, a differential pressure is created on part 61$^b$ of the lower section 61$^c$ of the valve whereupon the fuel pressure seats valve part 61$^b$ by spring 61$^d$. The quantity of fuel injected into said cylinders is dependent on the capacity of the fuel supply line and the fuel pressure at the beginning of injection in the fuel supply line.

My invention is cooperatively connected with the fuel supply line and is constructed to increase the mean fuel pressures for various engine loadings. In order to increase the fuel pressure at the beginning of injection, for low engine loads, i. e., slow engine speeds, it is necessary to decrease the volume or capacity of the fuel supply line or "rail", so that the proper maximum quantity of fuel will be injected into the engine cylinders. But in order to obtain a maximum fuel injection necessary for maximum engine speed and full engine loading with a fuel supply line of relatively small capacity, it would be necessary to have an extremely high pressure at the beginning of injection, in the fuel supply line which is obviously not feasible in practice.

My novel structure has eliminated the aforesaid difficulties and provides a practical and feasible structure which permits the employment of relatively high fuel pressures at the beginning of injection, in the fuel injection system for low engine speeds and loads but which increases the effective capacity of the fuel supply line for relatively high engine speeds and loads without the necessity of employing relatively high fuel pressures at the beginning of injection, in the fuel injection system. This is accomplished in the specific illustrated embodiment of my invention by providing means for utilizing the valve as a pump to make up for the difference in capacity of the fuel supply lines. The spring 19 in the accompanying illustration is constructed to regulate the fuel pressure at the beginning of injection, in the injection system desired. As shown in Figs. 2 and 3 the nut 25 which is adjustably secured to the stud 26 permits the spring 19 to move the valve or pump element 17 as the fuel pressure in the system falls. At full engine loads the nut or stop 25 may be adjusted to permit the valve or pump element 17 to deliver a maximum quantity of fuel to the engine, and the nut may be also adjusted to prevent the valve or pump element from moving at all. In Figs. 2 and 3 the principle of the invention is illustrated and said nuts or other suitable stops may be adjusted by means of any suitable devices and if desired may be conveniently adjusted by any suitable manually operated remote control device.

I find it desirable in some instances to operatively connect this stop device, controlling the travel of the valve or pump element, with the means regulating the valve for controlling the fuel pressure at the beginning of injection. Obviously there are many ways in which the stop or "rail" capacity controlling means may be connected up with the valve regulating means and in Figs. 4, 6, and 7 I have illustrated one means for providing this hook up. A stud or bolt 26—A constructed as shown may be employed, said stud having a bracket 30 secured thereto which preferably pivotally supports an eccentrically mounted cam 31, which may be actuated by a lever 32 connected by any means such as a link 33 with the lever 34 keyed, splined or otherwise secured to the valve 17. The link 33 is actuated by a bell-crank 33$^a$ pivoted at 33$^b$ to the regulator housing 16, the bell-crank being actuated by link 33$^c$. The latter link is connected to the bell-crank by a pivot pin 33$^d$ and to lever 34 by reason of its cylindrical end 33$^e$ slidable in ball 33$^f$, the latter being suitably mounted for universal movement in the end of lever 34. Thus as the lever 34 is actuated to vary the fuel pressure, at the beginning of injection, the means for controlling the travel of the valve or pump element is also actuated to vary the effective capacity of the fuel injection system.

Since the fuel pump is delivering an excess of fuel at all times, the pressure in the rail, at the beginning of fuel injection, will depend on the amount of compression of spring 19 which loads the valve 17 and the amount of compression will depend on the adjustment of lever 34 and the relation of groove 17$^a$ to passage 18. In Fig. 2 if the lever 34 is rotated 90° to register the top of groove side 17$^b$ with passage 18 then the valve 17 will move downward from its position in Fig. 2 until passage 18 is barely open sufficiently to relieve the rail of the excess fuel being delivered by the fuel pump. In such position of valve 17 the spring 19 is extended to its maximum and the fuel pressure will be under its minimum pressure at the beginning of injection. Now the quantity of fuel injected depends on two items. Firstly, the pressure at the beginning of injection as determined by the setting of the valve 17 determines the quantity of injection, it being apparent that as the pressure at the beginning of injection increases the quantity of fuel injected will increase. Secondly, the capacity of the fuel line or fuel system will determine the elasticity characteristic of the fuel, it being apparent that as the capacity increases the quantity of fuel injected will increase, as the pressure drop determining closing of the atomizer 60 will not occur as quickly as for lesser capacities. Therefore, when injection occurs and the fuel pressure tends to drop, the valve 17 under the influence of spring 19 acts like a piston in moving downwardly to its limiting position determined by the cam 31.

When cam 31 is positioned for maximum clearance with the fixed portion 16$^a$ of regulator 16 then the valve 17 has its maximum downward stroke during fuel injection tending to oppose the normal rate of fuel pressure drop and thereby increase the quantity of fuel injected.

In operation of the engine the fuel pump 14 draws fuel from reservoir 15 and conduit 9, delivering fuel in excess of engine requirements to rail 12 and branches 13 thereof, the excess fuel being returned to reservoir 15 by conduit 20 and passage 18. The fuel pump illustrated is geared with the engine to have four pulsations during a complete cycle of the four cylinder four stroke cycle illustrated, thereby providing one pump pulsation for each injection nozzle. The pressure of the fuel in rail 13 prior to injection of any fuel nozzle is determined by the rotative adjustment of piston valve 17 and the relation of its groove 17a with port 18. As injection at any nozzle takes place the fuel pressure tends to drop in rail 13 and the spring 19 tends to urge piston valve 17 downwardly to oppose the pressure drop. The setting of the cam 31 or stop 25 determines the extent of downward movement of piston valve 17 and hence determines as one factor the quantity of fuel injected. Thus by varying the fuel pressure at the beginning of injection and by varying the amount of travel vertically of piston valve 17 the quantity of fuel injected at any nozzle may be regulated or controlled within the objects of my invention. Thus the pressure valve 17 varies the capacity of the fuel supply line or rail 13 since when valve 17 is moved downwardly the resulting capacity for elasticity of the fuel is reduced and the quantity of fuel injected thereby lessened.

In Figs. 4, 6, and 7 the capacity and fuel pressure at the beginning of injection are simultaneously varied. In Figs. 6 and 7 the lever 34 has positioned valve 17 for maximum pressure at the beginning of injection and the cam 31 is positioned for maximum clearance with the fixed abutment 16a. As lever 34 is moved 90° clockwise (looking downwardly on the regulator) in its slot 34a, the valve 17 positions the groove 17a opposite opening 18 for minimum fuel pressure at the beginning of injection and cam 31 is positioned for minimum clearance with fixed abutment 16a. Thus, the pressure at the beginning of injection decreases simultaneously with decreasing capacity with the aforesaid movement of lever 34.

It may be noted that by employing my novel device it is possible to provide a higher relative pressure at the beginning of injection and mean fuel pressure for minimum engine speeds and loads thereby obtaining better fuel economy and improved engine performance at the lower range of engine loadings, and equally as good fuel economy and general engine efficiency at the higher range of engine loadings. Such a device as I have described may be very readily controlled and easily operated automatically in response to the engine throttling mechanism.

It will be apparent to those skilled in the art to which my invention pertains that various modifications and changes may be made therein without departing from the spirit of my invention or from the scope of the appended claims.

What I claim as my invention is:

1. In an internal combustion engine of the compression ignition type having a cylinder provided with a fuel inlet opening and means for atomizing the fuel, a fuel supply line communicating with said atomizing means, means tending to maintain the fuel in said supply line under pressure, means regulably controlling the fuel pressure in said supply line at the beginning of injection, means for varying the capacity of said supply line, and means connecting said regulable pressure controlling means and said capacity varying means whereby to control the quantity of fuel injected by said atomizing means.

2. In an internal combustion engine of the compression ignition type having a cylinder provided with a fuel inlet opening and means for atomizing the fuel, a fuel supply line communicating with said atomizing means, means tending to maintain the fuel in said supply line under pressure, and means including a valve element rotated to control the fuel pressure in the supply line at the beginning of injection and reciprocated to vary the capacity of the supply line.

3. In an internal combustion engine of the compression ignition type having a cylinder provided with a fuel inlet opening and means for atomizing the fuel, a fuel supply line communicating with said atomizing means, means tending to maintain the fuel in said supply line under pressure, a piston valve, a spring acting on said piston valve, said piston valve being subjected to the fuel pressure in the supply line acting in opposition to said spring, means for adjusting said piston valve to regulate the pressure in the fuel supply line, and means regulating the stroke of the piston valve during fuel injection.

4. In an internal combustion engine of the compression ignition type having a cylinder provided with a fuel inlet opening and means for atomizing the fuel, a fuel supply line communicating with said atomizing means, regulable means for maintaining predetermined fuel pressures in said fuel supply line at the time of injection over a plurality of engine load variations and for controlling the capacity thereof, and means for adjusting said regulable means for independently varying said pressure and capacity.

5. A device of the character specified for controlling the operation of an engine of the compression ignition type having a supply line adapted to contain fuel under pressure, said device including a combined fuel pressure and capacity controlling plunger valve associated with said fuel supply line, and independently actuated adjusting devices cooperatively associated with said plunger valve, one of said devices adapted for positioning said plunger valve to control the fuel pressure in said fuel supply line at the time of injection and the other of said devices adapted for limiting the movement of said plunger valve during fuel injection to control the effective capacity of said associated fuel supply line.

6. A device of the character specified for controlling the operation of an engine of the compression ignition type having a supply line adapted to contain fuel under pressure, said device including a combined fuel pressure and capacity controlling plunger valve associated with said fuel supply line, and independently actuated adjusting devices cooperatively associated with said plunger valve, one of said adjusting devices including an adjustable abutment for limiting the travel of said plunger valve to control the effective capacity of said fuel supply line.

7. A device of the character specified for controlling the operation of an engine of the compression ignition type having a supply line adapted to contain fuel under pressure, said device including a combined fuel pressure and capacity controlling plunger valve associated with said fuel supply line, and independently actuated adjusting devices cooperatively associated with said plunger valve, one of said adjusting devices including an abutment adjustable longitudinally of said plunger valve to limit the stroke thereof for controlling the effective capacity of said fuel supply line.

8. A fuel supply regulator for a fuel injection engine having a fuel supply system and comprising a casing structure having a fuel inlet communicating with said system and an outlet, valve means within said casing for regulably controlling said outlet, and a plurality of adjusting devices associated with said valve means and operable to selectively vary the pressure of the fuel at said inlet and the effective capacity of the system.

9. A fuel supply regulator for a fuel injection engine having a fuel supply system and comprising a casing structure having a fuel inlet communicating with said system and an outlet, a piston valve movably supported within said casing for regulably controlling said outlet, and valve controlling devices consisting of means for varying the pressure of the fuel at said inlet and means for varying the stroke thereof to vary the effective capacity of the system.

10. A fuel injection engine throttling device including a fuel pressure regulator operably cooperating with an engine fuel supply system and having a fuel inlet communicating with the supply system and an outlet, valve means associated therewith and regulably operated to vary the pressure of the fuel at said inlet, and other means adjusting said valve means to regulate the valve operation for varying the effective capacity of the fuel supply system.

11. A device of the character specified for controlling the operation of an engine of the compression ignition type having a supply line adapted to contain fuel under pressure, said device including a combined fuel pressure and capacity controlling valve means associated with said fuel supply line, independently actuated separate adjusting devices cooperatively associated with said valve means, and means limiting the movement of said adjusting devices.

12. In an internal combustion engine of the fuel injection type having a cylinder and associated fuel atomizing means, a fuel supply line adapted to contain fuel under pressure, and a device for controlling engine operation including a fuel pressure controlling element, regulable means for adjusting same to vary the fuel pressure in the fuel supply line at the beginning of injection, said element being movable to vary the capacity of the fuel line, and a second regulable means controlling the movement of said element whereby to selectively control the capacity of said fuel supply line.

13. In an internal combustion engine of the fuel injection type having a cylinder and associated fuel atomizing means, a fuel supply line adapted to contain fuel under pressure, and a device for controlling engine operation including a fuel pressure controlling element comprising a plunger yieldingly maintaining pressure in said fuel supply line, regulable means for adjusting the plunger to vary the fuel pressure in the fuel supply line at the beginning of injection, said plunger being movable to vary the capacity of the fuel line, and a second regulable means controlling the movement of said plunger whereby to selectively control the capacity of said fuel supply line.

14. A device of the character specified for controlling the operation of an engine of the compression ignition type having a supply line adapted to contain fuel under pressure, said device including a combined fuel pressure and capacity controlling plunger valve associated with said fuel supply line, and independently actuated adjusting devices cooperatively associated with said plunger valve, one of said adjusting devices including an abutment slidably secured to said plunger valve and adapted for selective adjustment to limit the stroke of said plunger valve to control the effective capacity of said fuel supply line.

EDWARD T. VINCENT.